United States Patent [19]
Graham et al.

[11] Patent Number: 6,106,760
[45] Date of Patent: Aug. 22, 2000

[54] ELECTROSTATIC INTERFACING, UNDERLINING, AND APPLIQUE

[76] Inventors: Barbara Graham, 4708 18th St., Lubbock, Tex. 79416; Katherine L. Kilman, 3212 44th St., Lubbock, Tex. 79413; Robert L. Graham, 4708 18th St., Lubbock, Tex. 79416

[21] Appl. No.: 08/908,251

[22] Filed: Aug. 7, 1997

[51] Int. Cl.$^7$ ..................................................... B29C 71/04
[52] U.S. Cl. .......................... 264/484; 442/401; 442/402; 442/382
[58] Field of Search ............................. 264/484; 442/401, 442/402, 382

[56] References Cited

U.S. PATENT DOCUMENTS

| | | | |
|---|---|---|---|
| 4,375,718 | 3/1983 | Wadsworth et al. | 29/592 E |
| 5,401,446 | 3/1995 | Tsai et al. | 264/22 |

*Primary Examiner*—Terrel Morris
*Assistant Examiner*—John J. Guarriello
*Attorney, Agent, or Firm*—R. L. Graham

[57] ABSTRACT

A thermoplastic fabric for use as a support fabric in interfacing, underlining, and applique carries a persistent electrostatic charge that causes the fabrics in contact therewith to cling thereto in a nonslip relationship. This facilitates sewing of the layers together. The preferred support fabric is a nonwoven fabric such as meltblown and spunbonded fabrics.

17 Claims, 2 Drawing Sheets

ELECTROSTATIC INTERFACING, UNDERLINING, AND APPLIQUE

BACKGROUND OF THE INVENTION

This invention relates to the art of sewing garments and crafts using support fabrics for interfacing, underlining, and applique. In one aspect, it relates to using such fabrics made from a thermoplastic fabric that has been electrostatically charged. In a specific aspect, it relates to using interfacing made from electrostatically charged thermoplastic fabric wherein the charge imparts cling thereto that keeps the interfacing fabric firmly in place as it is attached to a garment or other crafted object.

Interfacing is an important part of garments and other hand sewn crafts. Interfacing is any fabric that is "sandwiched" between an outer fabric (referred to as "outer layer") and an inner fabric (referred to as "facing layer"). Interfacing is defined as a third layer of fabric lying between the facing (or lining) and the outer layer of a garment. Interfacing is used in garments to provide shape, stiffness, support, and a tailored look in lapels, cuffs, pockets, hems, collars, and around buttonholes for strength. Interfacing may be used in crafts for shape, support, firmness, and to change the fabric properties, such as drape. Underlining fabrics are of the same general structure as interfacing and serve the same function in sewing (e.g. support and shape). They differ basically only in the absence of a third layer. With underlining fabrics, there generally is no facing layer. Thus, the description of "interfacing" applies to "underlining", except as otherwise indicated. Craft applications include quilting and applique, wearable art, fabric jewelry, and baskets to name a few.

The interfacings presently available are made from virtually any fabric including woven fabrics, nonwoven fabrics and webs, and knit fabrics.

Two types of interfacing are presently in use for attaching interfacing to a garment or craft item. One type is usually referred to as a sew-in interfacing wherein, as the name implies, the interfacing is cut in the desired shape and is sewed or stitched to the outer fabric layer, the facing fabric, or both. The principal problem with sew-in interfacing is that the interfacing must be held in place by pins or temporary basting stitches as the interfacing is stitched into place on the base fabric and/or facing fabric. Pinning and basting are inconvenient, time-consuming, and sometimes not very effective.

The second type of interfacing is referred to as fusible interfacing. This type of interfacing comprises a fabric that has applied thereto a heat sensitive bonding agent or adhesive. Fusible interfacing is usually marketed to the user in bulk quantities. The user must cut the interfacing to the desired shape, lay the interfacing on the facing layer and apply heat to the interfacing with an iron to activate the bonding agent. Once the interfacing is bonded to the facing layer, the outer layer of fabric may be sewn to the interfaced facing layer to cover the interfacing and provide the desired end appearance. Fusible interfacing of various weights and thickness are marketed by Freudenberg Nonwovens, Pellon Division of New York, N.Y. This type of interfacing also comprises a paper backing which covers the bonding agent and is peeled off prior to use. U.S. Pat. Nos. 4,007,835; 4,906,507; and 5,603,101 disclose fusible nonwoven thermoplastic interlining fabrics.

The sew-in and fusible interfacings have been used successfully for many years. However, there are undesirable aspects to both types of interfacing. The sew-in interfacing is often difficult to keep in place as it is attached to the facing layer, because it does not have a bonding agent. The two layers of fabrics tend to slide or slip relative to each other during sewing. For best sewing results, the two or three layers should be maintained together in a non-slip composite. Moreover, the sewing or basting steps are tedious and time-consuming. This may result in the interfacing not being in the proper position or orientation in relation to the facing fabric in the final product and may degrade the appearance. The fusible interfacing requires the additional step of heating the interfacing to activate the bonding agent. This may be a time-consuming and expensive step to a mass producer of garments and/or craft items. The bonding agent may also shrink and bubble or harden and crack in time as well as gum-up the iron used to activate the bonding agent. There is therefore a need for an interfacing material that has good fabric properties and that will remain in place as it is sewed without the use of heat sensitive bonding agents.

The present invention relates to the use of a fabric as an interfacing, underlining, and applique material made from electrostatically charged fabric. As defined herein, interfacing, underlining and applique fabric means a web made from synthetic fibers. The fabric may be woven, knitted, or nonwoven such as those manufactured using the meltblowing process or the spunbond (spinning) process. Each process is described briefly below. It has been found that the electrostatic charges create an electrostatic cling between the interfacing and the base fabric sufficient to hold the interfacing firmly in place without the need for pinning, basting, or the use of a heat activated bonding agent.

Woven and knitted fabrics are well-known in the art and for purposes of the present invention need no fuirther description. Since the nonwovens are the preferred interfacing fabrics, a brief description of the most important nonwoven processes may be helpful: meltblowing and spunbonded processes.

Meltblowing is a process wherein a molten polymer is extruded through a meltblowing die to form a plurality of side-by-side fibers. Convergent sheets of air are directed onto opposite sides of the fibers as they leave the die. The air draws and attenuates the fibers to microsized diameters (viz. 05–15 microns). The fiber and air stream is directed onto a moving collector surface where the fibers deposit in a random pattern and form a nonwoven fabric or web. The fabric is held together primarily by interfiber entanglement with some fiber sticking while in the molten or semi-molten state. The fibers may be continuous or discontinuous filaments. By varying operating conditions, meltblown fabrics having different basis weights may be produced.

It is well-known in the art of meltblowing to apply an electrostatic charge to the fibers as they are extruded or, alternatively, after the fabric is formed. Electrostatically charged meltblown webs are often referred to as electrets. Electrets were originally developed for gas filtration applications wherein the charges act to attract particulate matter that flows through the web. Since most nonwoven webs are dielectrics, the charge is very persistent and may be sustained for periods of a year or longer. U.S. Pat. Nos. 4,215,682 and 4,904,174 disclose apparatus for producing electrets by the "hot charging" method as well as test data indicating the filtration efficiency of the webs. PCT application PCT/US/93/09630 and the U. S. counterpart U.S. Pat. No. 5,401,446 disclose "cold charging" methods and apparatus for producing electrets.

Spunbonded fabrics are nonwoven fabrics that are produced by extruding a molten polymer through a spinneret that is a metal disc containing numerous minute holes through which the polymer is forced. Continuous filaments are extruded through the spinneret and are blown by low velocity air and deposited on a moving foraminous conveyer. The hot filaments are still sufficiently molten to bond to themselves at their crossover points. The desired orientation of the filaments in the web are achieved by rotating the spinneret, by electrical charges, by controlled airstreams, and by the speed of the conveyer. The web can be additionally bonded by passing through compaction rolls and/or hot-roll calendering. Spunbonded webs generally have larger average diameter filaments (viz. 10–100 microns, typically 20 to 60 microns) than meltblown webs and, therefore, tend to be heavier and stiffer. Spunbonded webs can be electrostatically charged by methods described in U.S. Pat. Nos. 4,592,815; 4,375,718; and 5,401,446.

A paper presented at "Fiber Producer Conference 1983", in Greenville, S.C. entitled "Nonwoven Fabrics: Spunbonded and Meltblown Processes" describes the two processes in detail. The disclosures of this paper are incorporated herein by reference.

SUMMARY OF THE INVENTION

The present invention provides a garment and craft interfacing* material made from an electrostatically charged fabric. The charges on the fabric surface have been found to be very effective in holding the interfacing in a substantially non-slip relationship (at least for the purposes of sewing) with the facing layer and/or an outer layer while it is sewn in place, without the need for pinning, basting, bonding agents, or heating. The charged fabrics can be made available in a wide range of fabric weights and stiffness to suit a variety of applications. *For clarity of description, the term "interfacing" will be used to describe the electrostatically charged support fabric, it being understood that the description applies also to underling fabric and applique support fabric.

The fabrics include any of the wide variety of fabrics presently used as interfacing, provided the fabrics can be sufficiently electrostatically charged for the purpose of the present invention. The preferred fabrics are wovens, knitted, and nonwoven fabrics of thermoplastics. The most preferred fabrics are nonwoven thermoplastics. Nonwoven fabrics are defined herein as a manufactured web of directionally or randomly oriented fibers, made by bonding or entangling fibers through mechanical thermal or mechanical means. As noted above, nonwovens are manufactured mainly by two well-known processes: meltblowing and spunbonding.

The process of the present invention involves the steps of (a) selecting a thermoplastic fabric, preferably a nonwoven fabric, of the desired shape, and having an electrostatic charge imparted thereto, (b) positioning the electrostatically charged fabric in overlaying contact with a facing layer or an outer layer wherein the charged fabric adheres by electrostatic cling to at least the facing layer or outer layer by the electrostatic charge imparted thereto; and (c) sewing or stitching the two layers together, with or without a third layer.

The cling imparted by the electrostatic charge causes the interfacing to adhere in a nonslip relationship to one or both of the flanking layers without the need of pins, fusion or basting. This permits the three layers t o be manipulated and sewn without layer slippage.

The interfacing fabric may be made of any of the thermoplastics presently used as interfacing material. The most preferred interfacing is a nonwoven made of polyester (PET).

The preferred charging of the thermoplastic interfacing is by cold charging wherein the interfacing is passed one or more times through an electric field. The most preferred method of electrostatically charging the interfacing is by methods described in U.S. Pat. No. 5,401,446 wherein the thermoplastic web is sequentially subjected to a plurality of electric fields such that adjacent electric fields have substantially opposite polarities. The disclosures of U.S. Pat. No. 5,401,446 are incorporated herein by reference.

DESCRIPTION OF THE PREFERRED EMBODIMENTS

In order to better understand the present invention, the following terms need defining:

Fabric: A sheet structure made from synthetic fibers, filaments or yarns.

Nonwoven: A manufactured sheet, web, or batt of directionally or randomly oriented fibers, made by bonding or entangling fibers through mechanical, thermal, or chemical means. They exclude continuous films, paper, and products which are woven, knitted, tufted, or felted by wet-milling. For purposes of the present invention, the fibers are synthetic.

Meltblown Fabric: Nonwoven fabric made by the conversion of molten polymer to a web: the molten plastic is blown with hot, high-velocity air through extruder die tips. The filaments exiting from the extruder are attenuated during their formation until they break. The fibers break into short lengths, rather than being continuous as those formed from the spinneret used in spunbonding. The short fibers, thereby created, are spread with cool quench air onto a moving belt called a forming fabric, or onto a drum, where they bond to each other on cooling, to form a white, opaque, fine-fibered web.

Spunbonded Fabric: Nonwoven fabric made by the conversion of molten polymer to a web. Continuous filaments are extruded through a spinneret, a device with tiny holes like a shower nozzle. The filaments are blown about and spread on a moving belt, called a forming fabric or wire. The hot filaments are still sufficiently molten to adhere and thereby bond to themselves at their crossover points. The desired orientation of the fibers in the web are achieved by rotating the spinneret, by electrical charges, by controlled airstreams, and by the speed of the belt. The web can be additionally bonded by passing through compaction rolls and/or hot-roll calendering.

Thermoplastics or Thermoplastic Polymers: A high polymer that softens when exposed to heat and returns to its original condition when cooled to room temperature. The term is usually applied to synthetics such as polyvinyl chloride, nylons, fluorocarbons, polyethylene, polypropylene, polyurethane prepolymer, polystyrene, polypropylene, and cellulosic and acrylic resins.

Electrostatic Charge: Stationary electrons on a surface of a fabric.

Electrostatic Cling: The electrostatic attraction of a layer (e.g. facing layer) to an electrostatically charged layer (e.g. charged interface layer) to cause the two layers to adhere together.

Garment Interfacing

Figure 1:
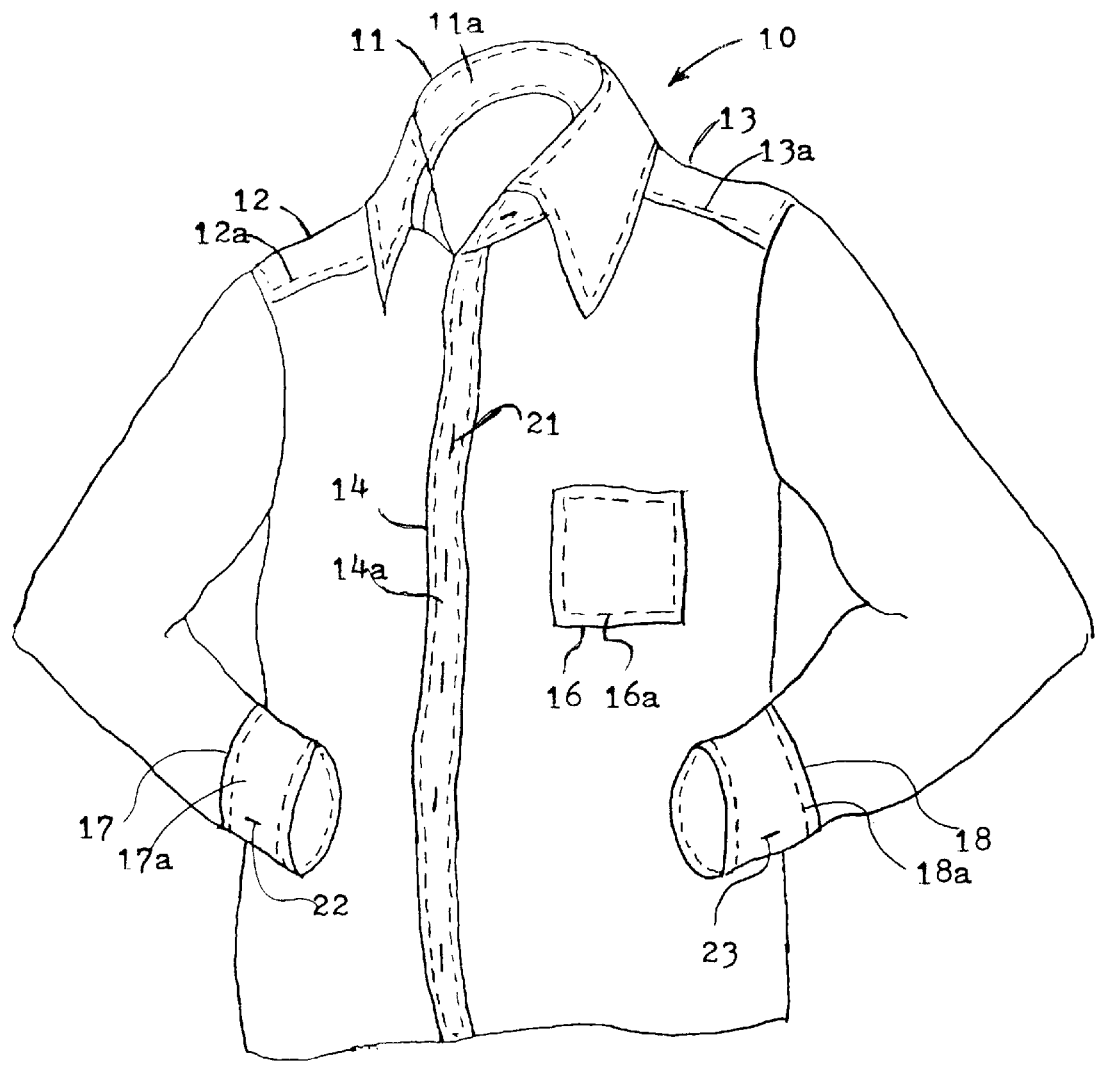
FIG. 1 is an elevational view illustrating the application of the present electrostatic interfacing for use in a shirt garment.

FIG. 1 illustrates the use of the present electrostatic interfacing in a shirt garment in accordance with the present invention. The shirt is by way of example only, and the interfacing may be applied equally in the construction of any garment requiring interfacing including trousers, jackets, dresses, etc. Shirt 10 comprises the components of collar 11, shoulder sections 12 and 13, lapel 14, pocket 16, and two sleeves having cuffs 17 and 18. Electrostatic interfacing fabric that lies below the outer layer of fabric of the shirt are illustrated in FIG. 1 using broken lines. Thus collar 11 has therein interfacing layer 11a, shoulder sections 12 and 13 have therein interfacings 12a and 13a respectively, lapel 14 has therein interfacing 14a, pocket 16 has interfacing 16a, and cuffs 17 and 18 have therein interfacings 17a and 18a respectively. All of the aforementioned interfacing layers are added to provide support, stiffness, or shape at desired points on the garment. Lapel interfacing layer 14a is also added to provide strength around buttonholes 21. Likewise cuff interfacing 17a and 18a strengthen buttonholes 22 and 23 respectively.

Figure 2:
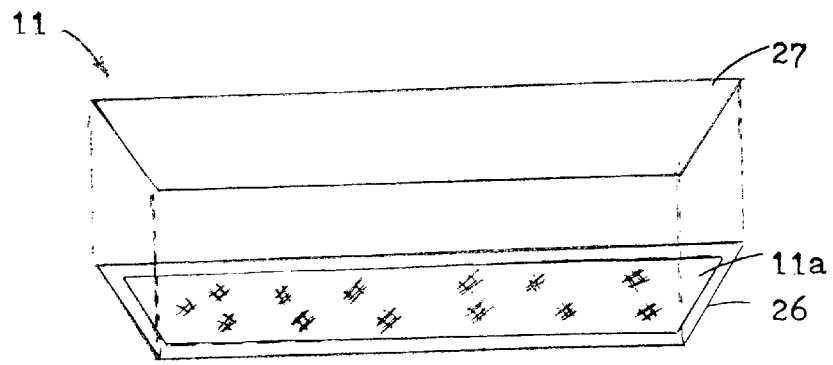
FIG. 2 is an exploded view of composite, illustrating the application of the present electrostatic interfacing for use in a collar.

FIG. 1 illustrates the extensive use of interfacing in a single garment and thus the importance of interfacing in the garment industry as a whole. In each of the above components, the attachment of the interfacing is generally the same in that the interfacing is sandwiched between a facing (or inner layer) of fabric and an outer layer of fabric as illustrated for collar 11 in FIG. 2. Collar 11 has facing layer 26 and outer layer 27 having sandwiched therebetween electrostatic interfacing 11a. For constructing the collar, interfacing 11a is cut from a bulk stock slightly smaller than the inner layer and outer layer fabrics. The interfacing is laid onto either the facing layer or outer layer of collar 11, and the electrostatic attraction (electrostatic cling) therebetween due to the persistent charge on interface 11a is sufficient to hold the interfacing firmly in place as outer layer 27 is stitched to facing layer 26 and interfacing 11a around the outer edges of the collar. The charges may also attract the outer layer 27 for holding the facing/interfacing/outer layers assemblage together. The collar so constructed is then attached to the neckline of the shirt. The other components of shirt 10 are constructed by a similar procedure. Note also that there may be applications in which no facing layer (inner layer) of fabric is used, and the end product comprises an outer layer and interfacing only. In this case, the outer layer of the garment will be designed so that the interfacing will not show.

It should be noted that it is not necessary for the facing or outer layers to be charged since the layer(s) in contact with the interfacing will become naturally polarized with a charge opposite that of the interfacing due to the electrostatic field that surrounds the interfacing.

It should be emphasized that there are numerous ways to use and attach interfacing in a particular garment and the particular method used may be unique to the artisan. Methods for using interfacing in garments are described in detail in, among many other sources, *The Complete Family Sewing Book*, published by Playmore Publishing Co. of New York, N.Y. The book describes the use of fusible interfacing provided with a bonding agent for fusing the interfacing to the garment by application of heat. The important point to be made is the present electrostatic interfacing may be substituted for the fusible interfacing in most, if not all, the applications described in the Reference. The garments described therein may be constructed following precisely the steps described, however, without the step of fusing the interfacing to the garment by ironing. The natural electrostatic cling between the charged interfacing and the garment is sufficient to hold the interfacing in its proper position as the garment is constructed.

As indicated above, the interfacing layer of the present invention is for use in garments and may be woven, nonwoven, and knitted synthetic fabrics. The preferred interfacing material is nonwoven thermoplastic. Accordingly, the description of the various embodiments is with reference to these materials; it is emphasized, however, that the principles involved in the present invention are also applicable to woven and knitted thermoplastics.

The garment in certain areas such as collar 11, cuffs 17 and 18, and lapel 14 comprise three layers: an outer layer 27, an interfacing fabric 11a, and a facing layer 26. Each of these layers are described below.

Interfacing fabric: Any of the fabrics presently used for interfacing, provided they can be electrostatically charged, The preferred fabric is a thermoplastic nonwoven.

The preferred nonwovens are meltblown thermoplastics and spunbonded thermoplastics.

The preferred thermoplastics that have been demonstrated can be electrostatically charged include nonwoven webs prepared from nonconductive polymeric material such as those selected from the group consisting of polypropylene (PP), recycled and virgin polyethylene terephthalate (PET), all types of polyethylene (PE), such as linear low density polyethylene (LLDPE), polybutylene terephthalate (PBT), polycarbonates, polychlorotrinluoroethylene (PCTFE), and polycyclohexyldimethylene terephthalate (PCT). In addition, the present invention is suitable for charging composites webs containing both conductive and nonconductive fibers such as meltblown/cotton/meltblown thermally bonded webs or meltblown/cotton hydroentangled or needle-punched webs, or hydroentangled mixtures of carded polyester staple fibers and wood tissue, such as SONTARA webs (DuPont). For economics, the preferred thermoplastics are PP, Pb, PET, copolymers and blends thereo f Polyester (PET) is the most preferred because its high melting point permits ironing of the constructed garment Also useable are the thermoplastic nonwovens (without adhesive) described in U.S. Pat. Nos. 4,906,507; 5,355,565; and 5,063,101, the disclosures of which are incorporated herein by reference. These include polyesters, polyester (PET) blends with PE and PP, PET/nylon blends, polyamides blends with PP and PE, and PUC, to name a few.

For purposes of illustration, the nonwoven preferably has the following properties:

|  | Range | Preferred Range |
|---|---|---|
| Basis weight (gm/m$^2$) | 10–150 | 30–100 |
| Average fiber size (microns) | 0.5–100 | 2.0–50 |

The thickness, of course, depends on the basis weight of the fabric, but may be generally of the same thickness range as those presently used in interfacing fabrics. The fiber size and basis weight, however, will vary depending on the application. In general, the fiber size and basis weight will be larger for applications wherein the interfacing is used to provide stiffness and/or strength such as in a lapel or collar.

Garment Layers: These layers may be any type such as wool, cotton, synthetics, or blends of these provided they exhibit cling to the charged interfacing. Fabrics including plant based fabrics (e.g. cotton), animal based fabrics (e.g. wool), synthetic fabrics (e.g. thermoplastics) and blends of these with each other or with silk or rayon may be used.

Charming Process: The electrostatically charged interfacing fabric useable in the present invention may be made by a number of processes. U.S. Pat. Nos. 4,215,682 and 4,904,174 disclose hot charging methods of charging hot filaments discharging from dies in meltblowing processes for forming electrets. U.S. Pat. Nos. 4,592,815; 4,375,718; and 5,401,446 disclose methods for electrostatically charging thermoplastic webs. The disclosures of these U.S. patents are incorporated herein by reference for disclosing methods, compositions, properties, and specifications of the webs capable of being electrostatically charged.

The preferred method, however, is the cold charging method, particularly that described in U.S. Pat. No. 5,401,446. As disclosed in this patent, a thermoplastic nonwoven web is electrostatically charged by passing it sequentially through a plurality of electric fields wherein each adjacent electric field has substantially opposite polarities. Each electric field is between 1 KVDC/cm and about 12/KVDC/cm; preferably 4–10 KVDC/cm.

The surface charge potential on the charged interfacing fabric should be sufficient to impart cling thereto, Average charge potential of at least ±100 v., preferable +200 v., and most preferably ±300 v. Some thermoplastics, because of the manner in which they are made, carry small levels of electrostatic charges (less that 20 v.). This level of charging is sufficient to provide the necessary cling for purposes of the present invention.

The surface charge potential of the charged we b may be determined by a Monroe model 244 Isoprobe Electrostatic Voltmeter with a 1017E Probe (0.07 inch opening) connected to a Velmex system that allows webs with dimensions up to 20×3 g inches to be scanned in both the machine direction and cross direction. The measurement system may be interfaced with an IBM AT computer using a DT 2801 I/O (Date Translation Inc. Marlborough, Mass.). The average value of the surface charge potential may be computed.

Charging may also be done Simco bars positioned on each side of the web to create the electric field. Simco charging equipment is available from Simco of Hatfield, Pa.

It is important to note that any of the thermoplastic fabrics (woven, nonwoven, and knitted) may be electrostatically charged by the process described in U.S. Pat. No. 5,401,446.

In summary the present invention may be viewed as a process comprising the following steps.

(a) electrostatically charging a thermoplastic interfacing fabric to impart electrostatic cling thereto by passing the fabric or fibers thereof through an electric field;

(b) placing the electrostatically charged fabric of the desired shape in contact with an outer fabric layer or a facing layer, wherein the electrostatic cling of the charged interfacing fabric causes the two layers in surface contact to cling to the interfacing fabric; and (c) sewing the two layers together with or without a third layer.

Generally, the two layers clinging together (e.g. wrong side of the facing layer interfacing layer) will be arranged with a third layer (e.g. wrong side of the outer layerin surface contact with the right of the facing layer) and then sewn together. The three layers thus sewn together are then turned right side out so that the right side of the outer layer faces outwardly and the right side of the facing layer faces inwardly, with the interfacing sandwiched therebetween, the charged interfacing may electrostatically cling to both flanking layers.

Underlining

Figure 4:
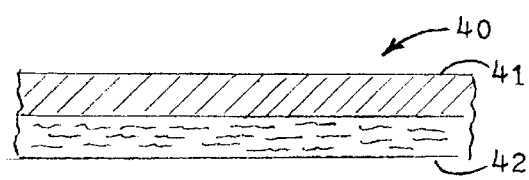
FIG. 4 is a cross-sectional fragmentary view of a fabric provided with an underlining.

The principles described above with respect to three layer interfacing can be used with underlining. With underlining, however, only two layers are used in the composite. As illustrated in FIG. 4, the composite 40 comprises an outer layer 41 and an electrostatically charged thermoplastic underlining 42. The underlining may be of the same construction and charged as described above with reference to interfacing. In the underlining process, the method involves (a) electrostatically charging a thermoplastic interfacing fabric to impart electrostatic cling thereto by passing the fabric or fibers thereof through an electric field;

(b) placing the electrostatically fabric of the desired shape in contact with the outer layer wherein the electrostatic cling of the charged underlining fabric causes the outer fabric to cling to the underlining fabric; and (c) sewing the two layers together.

Applique

Figure 3:
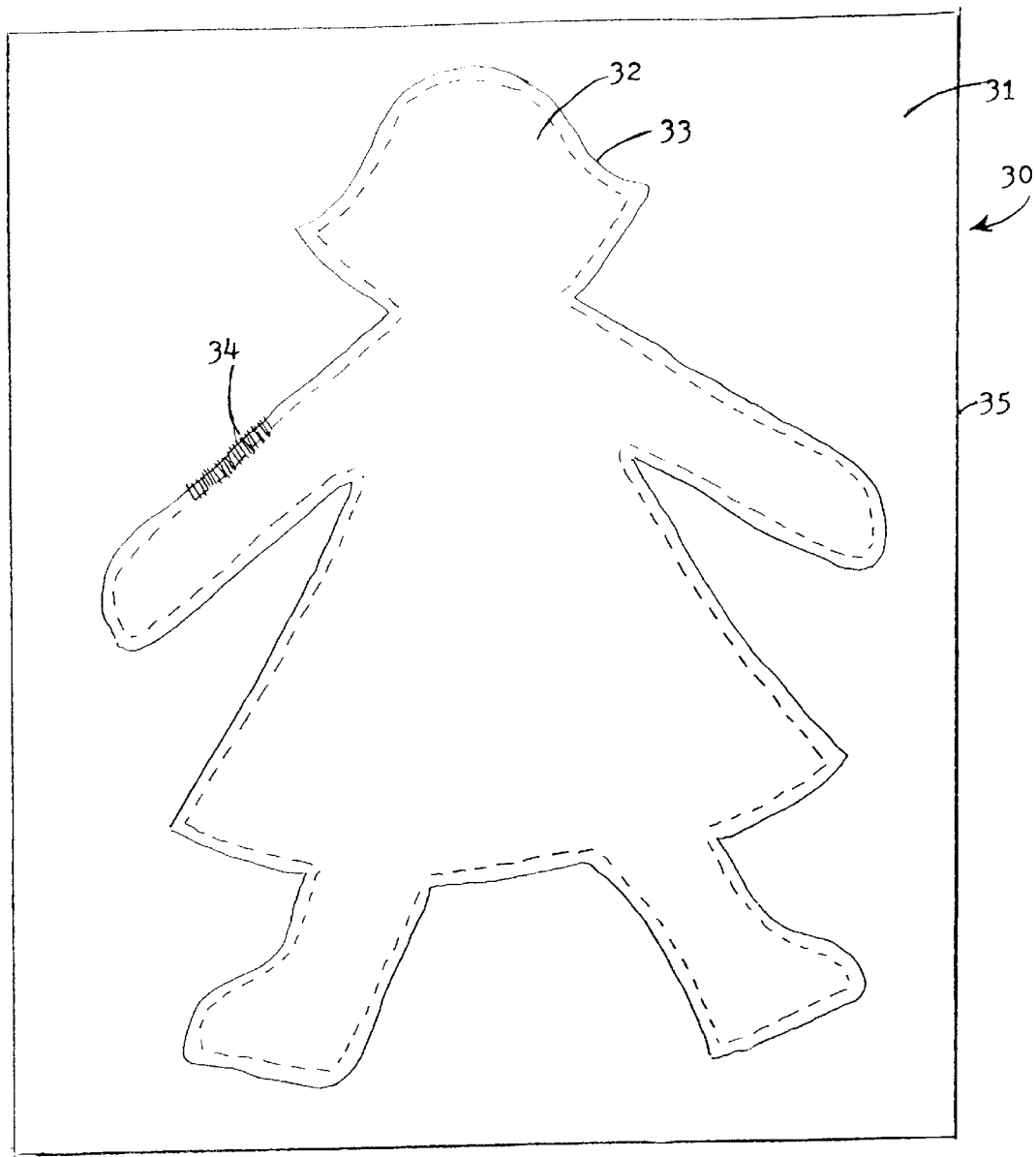
FIG. 3 is an elevational view illustrating the application of the present electrostatic interfacing for use in the art of quilting and/or applique.

FIG. 3 illustrates the application of the present interfacing for use in crafts in the art known as applique. The description of applique is made with reference to quilting block 30. However, the discussion is in no way intended to limit the scope of the invention as there are numerous craft applications for which the present interfacing may be used including handmade dolls, home decor, needlework, wearable art, fabric jewelry, to name a few.

Quilting block 30 is a single block designed to be joined along edges 35 with other blocks to form a larger quilt. Block 30 comprises base fabric 31 (which corresponds to the facing layer in garments), interfacing fabric 32 sandwiched between the base fabric and outer fabric 33. For constructing the block, interfacing 32 is cut to the desired shape (a doll pattern in this case) and laid onto base fabric 31. The interfacing is cut in the same general shape as the outer fabric 33, however, slightly smaller than the outer fabric so that it will not show then the block is completed. Electrostatic charges applied to layer 32 as has been described causes the interfacing to cling to the base 31 (even though base 31 is not charged). As a consequence, base fabric 31 with interfacing 32 thereon may be moved about as required for attaching outer fabric 33 by stitching around the periphery of the face as illustrated at 34. The charges also act to hold the base/interfacing/outer assemblage together as it is sewed. In the completed state, stitching 34 will be around the entire outer periphery of the outer fabric and interfacing. Note that while applying stitching 34, by hand or machine stitching, block 30 will be moved about in may positions to facilitate the operation. The electrostatic charges applied to interfacing 32 will cause the interfacing to cling to base 31, and the stitching may be carried out without concern that the interfacing will shift positions or otherwise become separated from the base. The fabrics useful in the applique are the same as those described for garment interfacing.

EXAMPLES

Three garment collars were made of the following materials:

|  | Sample A | Sample B | Sample C |
| --- | --- | --- | --- |
| Facing layer | cotton fabric | cotton fabric | cotton fabric |
| Interfacing layer | electrostatic charged nonwoven | fusible nonwoven | nonwoven |
| Outer layer | cotton fabric | cotton fabric | cotton fabric |

The three layers of each sample were precut. In Sample A, the charged nonwoven fabric was laid on the wrong side of the facing layer, and the outer layer was laid on the opposite side (right side) of the facing layer. The charged nonwoven layer was observed to cling to the facing layer in a nonslip relationship permitting the three layers to be easily manipulated and guided during the sewing step. The three piece collar was sewn on the long edge and the two side edges. The collar was then turned to the right side (inside out) through the unsewn edge, placing the interfacing between the facing layer and outer layer. The cling between the interfacing layer and the facing layer assisted in turning the three layers to the right side. Once turned right side out, the interfacing layer clung to the outer layer as well so that the three piece collar could be manipulated as a one piece composite.

In Sample B, a fusible web was used. The steps were the same except an ironing step was required to secure the interfacing to the wrong side of the facing layer. The ironing was time consuming and appeared to change the hand of the fabric.

In Sample C, the steps were the same as in Sample A. However, the nonwoven interfacing exhibited no apparent cling to the facing layer, so the three separate layers required much more careful manipulation during the sewing step. Once the composite was turned right side out (placing the interfacing between the facing layer and the outer layer), the three pieces did not cling together.

What is claimed is:

1. In a method of applying a thermoplastic interfacing fabric between an outer fabric layer and a facing layer of a garment to provide shape and support to the garment wherein the interfacing fabric is positioned between the two layers and is adhered to at least one of the layers and the three layers are sewn together, the improvement wherein the thermoplastic interfacing fabric carries an electrostatic charge to cause the interfacing fabric to adhere to the outer fabric layer and the facing layer by electrostatic cling, said electrostatic charge being imparted by passing the interfacing fabric or fibers thereof through an electric field.

2. The method of claim 1 wherein the interfacing fabric is a nonwoven.

3. The method of claim 2 wherein the interfacing fabric is a meltblown or spunbonded fabric having an average fiber size of 0.5 to 100 microns.

4. The method of claim 3 wherein the interfacing fabric is a thermoplastic selected from polyolefins, nylons, and polyesters.

5. The method of claim 4 wherein the thermoplastics is a polyester.

6. The method of claim 4 wherein the interfacing fabric has a surface charge of at least ±100 v.

7. The method of claim 4 wherein the interfacing fabric has a surface charge of at least ±200 v.

8. The method of claim 1 wherein the electric field is between 1 and 12 KVDC/cm.

9. The method of claim 1 wherein the fabric is a spunbonded fabric having a basis weight between 10 gMn/M$^2$ to 150 gm/m$^2$.

10. A method of applying a thermoplastic nonwoven interfacing fabric to a garment which comprises the steps of (a) passing the interfacing fabric through an electric field to impart an electrostatic charge to a surface thereof;

(b) positioning the electrostatically charged surface of the interfacing fabric in contact with a first cloth layer, the electrostatic charge causing the interfacing fabric to electrostatically cling to the first layer of cloth thereby securing the two layers together;

(c) placing a second cloth layer in contact with the first layer of cloth;

(d) sewing the three layers together on at least one edge to form a three layer composite;

(e) turning the three layer composite inside out along the sewn edge placing the interfacing layer between the two cloth layers; and (f) attaching the three layer composite to the garment.

11. The method of claim 10 wherein the interfacing fabric is a spunbonded fabric made of polyester.

12. The method of claim 11 wherein the polyester is a copolymer or homopolymer of PET.

13. The method of claim 10 wherein the nonwoven is a spunbonded fabric having an average fiber size of 10 to 50 microns and a basis weight between 10 to 150 gm/m$^2$.

14. A method of applying a support layer to a garment fabric which comprises (a) selecting a thermoplastic support fabric having a basis weight of between 10 and 150 gm/m$^2$, said fabric carrying an electrostatic charge of at least ±100 v, said electrostatic charge being imposed on the support fabric by passing the support fabric or fibers thereof through an electrostatic field;

(b) cutting the support fabric to the desired shape;

(c) placing the shaped support fabric in overlaying contact with an outer fabric for use in a garment or applique, the electrostatic charge of the support fabric causing the outer fabric to electrostatically cling to the support fabric; and (d) sewing the two fabrics together.

15. The method of claim 14 wherein the support fabric is a nonwoven fabric having an average fiber size of 0.5 to 100 microns.

16. The method of claim 15 wherein the nonwoven support fabric is a meltblown fabric having a basis weight of 30 to 100 gm/m$^2$ and an average fiber size of 0.5 to 15 microns.

17. The method of claim 15 wherein the nonwoven support fabric is a spunbonded fabric having a basis weight between 30 to 100 gm/m$^2$ and an average fiber size of 15 to 100 microns.

* * * * *